United States Patent
Imboden et al.

(10) Patent No.: US 12,353,169 B2
(45) Date of Patent: Jul. 8, 2025

(54) TIMEPIECE MECHANISM PROVIDED WITH A MAGNETIC GEAR

(71) Applicant: The Swatch Group Research and Development Ltd, Marin (CH)

(72) Inventors: Matthias Imboden, St-Blaise (CH); Jean-Pierre Mignot, Pontarlier (FR); Milan Calic, La Conversion (CH); Cédric Nicolas, Neuchâtel (CH); Jean-Jacques Born, Morges (CH)

(73) Assignee: The Swatch Group Research and Development Ltd, Marin (CH)

( * ) Notice: Subject to any disclaimer, the term of this patent is extended or adjusted under 35 U.S.C. 154(b) by 453 days.

(21) Appl. No.: 17/869,273

(22) Filed: Jul. 20, 2022

(65) Prior Publication Data
US 2023/0062527 A1 Mar. 2, 2023

(30) Foreign Application Priority Data
Aug. 30, 2021 (EP) .................................. 21193818

(51) Int. Cl.
*G04B 11/00* (2006.01)
*G04B 13/02* (2006.01)
*H02K 49/10* (2006.01)

(52) U.S. Cl.
CPC ............ *G04B 11/005* (2013.01); *G04B 13/02* (2013.01); *H02K 49/102* (2013.01)

(58) Field of Classification Search
CPC ..... G04B 11/005; G04B 13/02; H02K 49/102
See application file for complete search history.

(56) References Cited

U.S. PATENT DOCUMENTS

| 3,183,426 | A | * | 5/1965 | Haydon | G04C 5/005 |
| | | | | | 74/504 |
| 3,400,287 | A | | 9/1968 | Huff | |
| 3,410,083 | A | * | 11/1968 | Korr | G04C 5/005 |
| | | | | | 74/1.5 |
| 5,633,555 | A | * | 5/1997 | Ackermann | F04D 13/027 |
| | | | | | 310/75 D |
| 9,715,217 | B2 | * | 7/2017 | Di Domenico | G04B 15/06 |

(Continued)

FOREIGN PATENT DOCUMENTS

FR 1 584 453 A 12/1969

OTHER PUBLICATIONS

European Search Report of EP 21 19 3818.8 dated Feb. 1, 2022.

*Primary Examiner* — Edwin A. Leon
*Assistant Examiner* — Jason M Collins
(74) *Attorney, Agent, or Firm* — Sughrue Mion, PLLC

(57) ABSTRACT

A mechanism (1) including a magnetic gear (2) including a first wheel (6B) and a second wheel (6C) provided with a first magnetic toothing (10) and a second magnetic toothing (12) respectively. The first and second magnetic toothings are respectively formed by first and second teeth made of a soft ferromagnetic material; and the magnetic gear (2) further includes a third wheel (6A) arranged between the first and second wheels (6B, 6C) and provided with a third magnetic toothing (8) formed by permanent magnetic poles, in particular by bipolar magnets. In general, the first wheel is a drive wheel, whereas the second wheel is driven into order to carry out a function or transmit a torque. The third intermediate wheel is preferably mounted such that it can rotate freely.

11 Claims, 2 Drawing Sheets

(56) References Cited

U.S. PATENT DOCUMENTS

| | | | |
|---|---|---|---|
| 10,558,170 B2* | 2/2020 | Junod | G04B 13/003 |
| 2017/0176946 A1* | 6/2017 | Junod | G04C 3/101 |
| 2017/0242403 A1* | 8/2017 | Di Domenico | G04C 5/005 |

* cited by examiner

TIMEPIECE MECHANISM PROVIDED WITH A MAGNETIC GEAR

CROSS REFERENCE TO RELATED APPLICATIONS

This application is claiming priority based on European Patent Application No. 21193818.8 filed on Aug. 30, 2021, the disclosure of which is incorporated herein in its entirely by reference.

TECHNICAL FIELD OF THE INVENTION

The invention relates to the field of magnetic gears formed by a first wheel and a second wheel meshing with one another magnetically.

In particular, the invention relates to a mechanism, in particular a timepiece mechanism, incorporating such a magnetic gear.

TECHNOLOGICAL BACKGROUND

Magnetic gears are known devices that can be used to transfer mechanical torque between two parts without any direct contact between the parts, and thus without resulting in wear or friction therebetween. Such gears provide the following benefits:
- no oil or lubricant is required since there is no mechanical wear on the teeth of the parts;
- the toothed parts can interact and transfer torque and mechanical power, even if they are hermetically separated; and
- the toothed parts can be used to limit the maximum torque, and can thus help to avoid damage, for example in the event of a mechanical impact.

Such a magnetic gear typically includes two wheels that mesh with one another magnetically. A first wheel is provided with first permanent magnetic poles, which are typically alternating and arranged in a circle and define a first magnetic toothing. These first magnetic poles are, for example, defined by bipolar magnets with radial and alternating magnetisation. A second wheel is provided with teeth made of a ferromagnetic material or second magnetic poles, these teeth or second magnetic poles being arranged in a circle and defining a second magnetic toothing. The first and second wheels are typically located in the same general plane. The magnetic coupling between the toothings of the first and second wheels means that when one of the first and second wheels is driven such that it rotates, the other wheel is also driven such that it rotates thanks to magnetic meshing.

However, one drawback of this type of magnetic gear is that it requires each tooth of the first wheel to be magnetised (by permanent magnetisation), typically in an alternating pattern. This has two important consequences: firstly, such a magnetic gear is expensive to manufacture; and secondly, even though the amount of interaction required between the two wheels is relatively small, the rotating magnets will generate significant magnetic field lines through the system containing the magnetic gear (typically a timepiece mechanism). However, it is very difficult to contain such magnetic field lines in order to protect the other components of the system from the effect induced by these field lines. Such an effect can be detrimental to the correct operation of the system, in particular when the system is a movement of a timepiece mechanism.

SUMMARY OF THE INVENTION

The invention thus aims to overcome the drawbacks of the prior art by providing a mechanism, in particular a timepiece mechanism, comprising a magnetic gear which is simple and inexpensive to manufacture, and which allows the number of permanent magnetic poles required for the magnetic gear to be reduced, while enabling the magnetic field lines to be contained in order to protect the various other components of a system containing the mechanism.

For this purpose, the present invention relates to a mechanism, in particular a timepiece mechanism, comprising a magnetic gear including a first wheel and a second wheel provided with a first magnetic toothing and a second magnetic toothing respectively. According to the invention, the first and second magnetic toothings are respectively formed by first and second teeth made of a soft ferromagnetic material; and the magnetic gear further comprises a third wheel arranged between the first and second wheels and provided with first permanent magnetic poles forming the magnetised teeth of a third magnetic toothing comprised in this third wheel and which is configured in such a way that first magnetic fluxes, having alternating polarities, emerge respectively from these magnetised teeth. The third wheel and the first wheel are arranged in such a way that the third magnetic toothing has a first magnetic coupling with the first magnetic toothing generated by said first magnetic fluxes which momentarily polarise, in magnetic attraction, teeth of the first magnetic toothing, momentarily located in a first magnetic coupling zone with the third magnetic toothing and thus through which first magnetic fluxes from among said first magnetic fluxes respectively flow. The third wheel and the second wheel are arranged in such a way that the third magnetic toothing or, where applicable, a fourth magnetic toothing, which is comprised by the third wheel and which is formed by second permanent magnetic poles from which second magnetic fluxes emerge with alternating polarities, has a second magnetic coupling with the second magnetic toothing, which is generated by said first magnetic fluxes, or respectively by said second magnetic fluxes, which momentarily polarise, in magnetic attraction, teeth of the second magnetic toothing which are momentarily located in a second magnetic coupling zone with the third magnetic toothing (8) or, where applicable, with the fourth magnetic toothing and thus through which first magnetic fluxes from among the first magnetic fluxes flow, or respectively though which second magnetic fluxes from among the second magnetic fluxes flow. The soft ferromagnetic material is preferably a material with high magnetic permeability and thus low magnetic reluctance.

Such a magnetic gear mechanism configured in this way produces a local and temporary magnetisation only on the teeth made of a soft ferromagnetic material of the first toothing and of the second toothing that are located in a respective magnetic coupling zone and that are active at a given moment in time. The number of permanent magnetic poles of the third wheel that are required to generate such local magnetisation is thus substantially reduced. This allows costs to be reduced and simplifies the manufacture of the mechanism, as well as allowing the magnetic field lines in the vicinity of where the torque transfer occurs between the first and second wheels to be contained locally. The presence of teeth made of a soft ferromagnetic material on the first and second wheels also allows the magnetic field lines produced by the permanent magnetic poles of the third wheel to be closed. The various components of a system containing the mechanism, such as a movement of a timepiece for example, are thus advantageously protected from the magnetic field produced.

Moreover, such a mechanism according to the invention intrinsically limits the maximum torque transmitted between the first and second wheels, thus protecting the gear from damage caused by a mechanical impact.

Preferably, the third magnetic toothing includes at least four magnetised teeth, in particular between four and ten magnetised teeth, inclusive. Similarly, when provided for in embodiments, the fourth magnetic toothing includes at least four magnetised teeth, in particular between four and ten magnetised teeth, inclusive.

According to a preferred embodiment of the invention, the third wheel is mounted such that it can rotate freely, this third wheel being configured to transmit a torque received from the first wheel, which is a drive wheel in the magnetic gear, to the second wheel which is driven by the first wheel via the third wheel so as to carry out a function of the mechanism or to transmit within the mechanism a torque received from the first wheel. The magnetic coupling between the first and second wheels is thus an indirect coupling, via the first and second magnetic couplings (intermediate couplings), between the first wheel and the third wheel on the one hand, and between the second wheel and the third wheel on the other hand.

The first magnetic toothing comprises N1 teeth, the second magnetic toothing comprises N2 teeth, and the third magnetic toothing comprises N3 teeth. Advantageously, the number N3 is an even number between four and ten, inclusive; and the ratio between the number N1 and the number N3, and the ratio between the number N2 and the number N3, are each greater than or equal to two, preferably greater than or equal to three. This improves the efficiency of the magnetic coupling between the first, second and third wheels for a limited number of magnets.

Where a fourth magnetic toothing is provided in some embodiments, this fourth magnetic toothing comprises N4 teeth. In an advantageous alternative embodiment, the number N4 is equal to the number N3. However, the number N4 can be intentionally different from the number N3. In an advantageous embodiment comprising the fourth toothing, the magnetised teeth of the third magnetic toothing are formed by first magnetic poles of a plurality of bipolar magnets, whereas the magnetised teeth of the fourth magnetic toothing are formed by second magnetic poles of this plurality of bipolar magnets, these second magnetic poles being physically separate from the first magnetic poles. In particular, the third wheel comprises N bipolar magnets and the number N is equal to both the number N3 and the number N4 (N=N3=N4). It should be noted that N bipolar magnets have by definition 2N magnetic poles.

According to a specific embodiment of the invention, the third wheel comprises said fourth magnetic toothing, and the first and second wheels extend in substantially perpendicular planes. The third wheel extends in a plane disposed at substantially 45 degrees (45°) to the plane in which the first wheel extends and to the plane in which the second wheel extends. Each of said first permanent magnetic poles forms, with a second permanent magnetic pole from among said second permanent magnetic poles, a bipolar magnet having axial magnetisation. The first, second and third wheels are positioned such that the one or more bipolar magnets coupled to the first magnetic toothing are simultaneously coupled to the second magnetic toothing.

In a general alternative embodiment, each of the first and second wheels includes at least six teeth which extend radially relative to the rotational axis of the wheel concerned. Each tooth takes the form of a protrusion that projects from an annular periphery of the wheel. In particular, each of the first and second wheels includes between six and thirty teeth which extend radially relative to the axis of the wheel.

When the plurality of bipolar magnets each have a radial polarisation, the third wheel advantageously has a central part made of a ferromagnetic material, on the periphery whereof the plurality of bipolar magnets are arranged and the outer magnetic poles whereof respectively define the magnetised teeth of the third magnetic toothing. This enables the magnetic field lines, in particular between adjacent bipolar magnets, to be effectively closed on the inner magnetic pole side of the plurality of bipolar magnets, via the central part of the third wheel.

Advantageously, the first wheel and/or the second wheel comprise/comprises a rim forming a continuous circular base for the respective magnetic toothing, this rim being made of a soft ferromagnetic material so as to form a closure closing magnetic paths of the magnetic fluxes.

In a specific alternative embodiment, the mechanism further includes a non-return device mechanically coupled to the second wheel. This prevents the wheels from slipping backwards, which can occur in particular with a high restoring torque, such as when a drive spring is wound for example. More specifically, such slippage can cause a runaway effect that is detrimental to the mechanism, whereby the second wheel rotates freely in the opposite direction to that of the desired torque transfer. Such a runaway effect, due to the wheels slipping backwards, can for example be initiated by a vibration, an impact, or any other mechanical disturbance within the mechanism in question (for example the winding of a spring).

According to one example embodiment of the invention, at least the first and second wheels are coplanar. In particular, the first, second and third wheels can be coplanar. In the latter case, the third wheel is formed in particular by a plurality of bipolar magnets with radial magnetisation/polarisation. According to another example embodiment of the invention, at least the first and second wheels extend in separate planes. In particular, the first, second and third wheels can each extend in a separate plane.

BRIEF DESCRIPTION OF THE FIGURES

The purposes, advantages and features of the mechanism according to the invention will appear more clearly in the following description of various non-limiting embodiments shown by way of the drawings, in which.

DETAILED DESCRIPTION OF THE INVENTION

Figure 1:
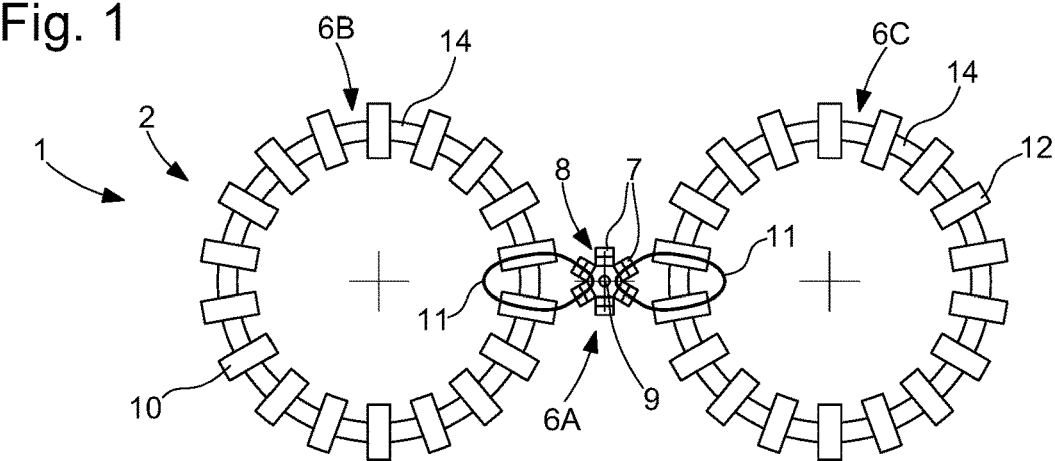
FIG. 1 is a top view of a mechanism incorporating a magnetic gear according to the invention, according to a first example of a first embodiment of the mechanism of the invention.

As shown in FIGS. 1 to 5, the present invention was drawn from the general inventive idea consisting of providing, in a magnetic gear 2 equipping a mechanism 1, in particular a timepiece mechanism, two wheels 6B, 6C, each provided with teeth made of a soft ferromagnetic material with relatively high magnetic permeability, these two wheels 6B, 6C being magnetically coupled to a third wheel 6A, of smaller diameter and in particular with pinion-like dimensions, provided with permanent magnetic poles which are arranged in a circle about the rotational axis thereof. This third wheel 6A, which is arranged between the first and second wheels 6B, 6C, produces a magnetic field coupled to two respective parts of these wheels 6B, 6C, each located in a respective magnetic coupling zone with the third wheel 6A. The first and second wheels 6B, 6C thus each magnetically mesh with the third wheel 6A which is an intermediate wheel, of smaller diameter, between the first and second wheels, this intermediate wheel generating magnetic fluxes allowing the first and second toothings to be locally magnetised/polarised and these first and second wheels to be magnetically coupled to one another in an indirect manner.

The magnetic field generated by the third wheel 6A thus produces a local magnetisation on each of the first and second wheels 6B, 6C, more specifically on toothings made of a soft ferromagnetic material of these wheels 6B, 6C, the teeth of these toothings being successively and temporarily magnetised/polarised, in particular by groups of teeth that are active at a given moment in time, i.e. momentarily located in a magnetic meshing zone with the third wheel 6A. The number of permanent magnetic poles of the third wheel 6A that are required to generate such temporary, local magnetisation of the first and second toothings, is thus substantially reduced. When one of the two wheels 6B, 6C or the third wheel 6A is driven such that it rotates, the other two wheels are also driven such that they rotate as a result of the magnetic couplings, in attraction, between teeth of these three wheels 6A, 6B, 6C in two magnetic meshing zones provided for these three wheels 6A, 6B, 6C. The magnetic field lines 11 produced by the magnetic couplings between the three wheels 6A, 6B, 6C are thus contained locally in the vicinity of where the torque transfer occurs.

The mechanism 1 can further include a non-return device (not shown in the figures) mechanically coupled to the second wheel 6C. The non-return device includes, for example, a ratchet wheel and a pawl. The ratchet wheel is fixed to the second wheel 6C for rotation therewith, and is provided with teeth that extend radially relative to the rotational axis of the ratchet wheel. The pawl cooperates with the teeth of the ratchet wheel in such a way as to prevent the second wheel 6C from rotating in the direction opposite to the direction corresponding to the desired torque transfer. This prevents the second wheel 6C from turning freely in this direction of rotation in the event of vibration, an impact or any other mechanical disturbance within the timepiece mechanism (the winding of a spring for example), which could be detrimental to the mechanical integrity thereof.

In the description hereinbelow, elements denoted by the same reference numerals are analogous.

A first embodiment of the mechanism 1 comprising a magnetic gear 2 according to the invention will be described hereinbelow with reference to FIGS. 1 and 2. According to this first embodiment of the mechanism 1, the first, second and third wheels 6B, 6C, 6A extend in the same general plane. The third wheel 6A is mounted such that it can rotate freely. The third wheel 6A is thus configured to transmit to the second wheel 6C a torque received from the first wheel 6B. The first wheel 6B is thus a drive wheel in the magnetic gear 2, and the second wheel 6C is driven by the first wheel 6B via the third wheel 6A so as to carry out a function of the mechanism 1 or to transmit, within this mechanism 1, a torque received from the first wheel 6B. The first wheel 6B is provided with N1 teeth made of a soft ferromagnetic material defining a first magnetic toothing 10. The second wheel 6C is provided with N2 teeth made of a soft ferromagnetic material defining a second magnetic toothing 12. The teeth of the first and second wheels 6B, 6C are made of a soft ferromagnetic material, preferably with high magnetic permeability, such as Mu-metal for example. The third wheel 6A, which is smaller in diameter than the other two wheels 6B, 6C, is provided with N3 outer permanent magnetic poles 7, defined by as many bipolar magnets with radial polarisation, which are arranged in a circle and form the magnetised teeth of a third magnetic toothing 8.

The first magnetic toothing 10 has a first direct magnetic coupling with the third magnetic toothing 8 such that, when one of the first and third wheels 6B, 6A is driven such that it rotates, the other wheel 6B, 6A is also driven such that it rotates, with a transmission ratio defined by the first and third toothings 10, 8, by the first direct magnetic coupling between these first and third toothings 10, 8. This first direct magnetic coupling is generated by magnetic fluxes of the third toothing 8 which momentarily polarise, in magnetic attraction, teeth of the first magnetic toothing 10 which are momentarily located in a first magnetic coupling zone with the third magnetic toothing 8 and thus through which these magnetic fluxes respectively flow.

The second magnetic toothing 12 has a second direct magnetic coupling with the third magnetic toothing 8 such that, when one of the second and third wheels 6C, 6A is driven such that it rotates, the other wheel 6C, 6A is also driven such that it rotates, with a transmission ratio defined by the second and third toothings, by the second direct magnetic coupling between these second and third toothings 12, 8. This second direct magnetic coupling is generated by magnetic fluxes of the third toothing 8 which momentarily polarise, in magnetic attraction, teeth of the second magnetic toothing 12 which are momentarily located in a second magnetic coupling zone with the third magnetic toothing 8 and thus through which these magnetic fluxes respectively flow. The magnetic coupling between the first and second wheels 6B, 6C is thus an indirect coupling, via the first and second direct magnetic couplings between the first wheel 6B and the third wheel 6A on the one hand, and between the second wheel 6C and the third wheel 6A on the other hand.

The N3 permanent magnetic poles 7 of the third wheel 6A form the magnetised teeth of the third magnetic toothing 8 from which magnetic fluxes of alternating polarities emerge. As the magnetic poles 7 are arranged in a circular manner with alternating polarisation, there is an even number thereof. Preferably, the number N3 is an even number between four and ten, inclusive. The magnetic poles 7 are typically arranged in pairs respectively with as many complementary magnetic poles, around a central part 9 forming the axis of the third wheel 6A or in an opening through which such an axis passes, and thus together form a plurality of bipolar magnets. In the event that the plurality of bipolar magnets have radial polarisation, the central part 9 is advantageously made of a ferromagnetic material or a mu-metal material. Such a material effectively closes the lines of the magnetic fields emerging from the inner magnetic poles of the plurality of bipolar magnets, in particular between adjacent bipolar magnets, via the central part of the third wheel 6A.

The number N1 of teeth of the first wheel 6B is preferably greater than the number N3 of magnetic poles 7 of the third wheel 6A. The ratio between the number N1 of teeth of the first wheel 6B and the number N3 of magnetic poles 7 of the third wheel 6A is advantageously greater than or equal to two, preferably greater than or equal to three. The number N2 of teeth of the second wheel 6C is preferably greater than the number N3 of magnetic poles 7 of the third wheel 6A. The ratio between the number N2 of teeth of the second wheel 6C and the number N3 of magnetic poles 7 of the third wheel 6A is advantageously greater than or equal to two, preferably greater than or equal to three. Preferably, each of the first, second and third wheels 6B, 6C, 6A is mounted on a pivot pin in a bearing.

According to a first example of the first embodiment of the mechanism 1, shown in FIG. 1, the first and second wheels 6B, 6C each comprise eighteen teeth made of a soft ferromagnetic material. Each tooth of the first wheel 6B and of the second wheel 6C is mounted on a respective rim 14 made of a non-magnetic material, with non-magnetic zones between the teeth of the first toothing 10 and non-magnetic zones between the teeth of the second toothing 12. The third wheel 6A comprises six bipolar magnets 7 with radial magnetisation, which respectively form the magnetised teeth of the third magnetic toothing 8. More particularly, the outer magnetic poles of the plurality of bipolar magnets define the magnetised teeth of the third magnetic toothing.

Figure 2:
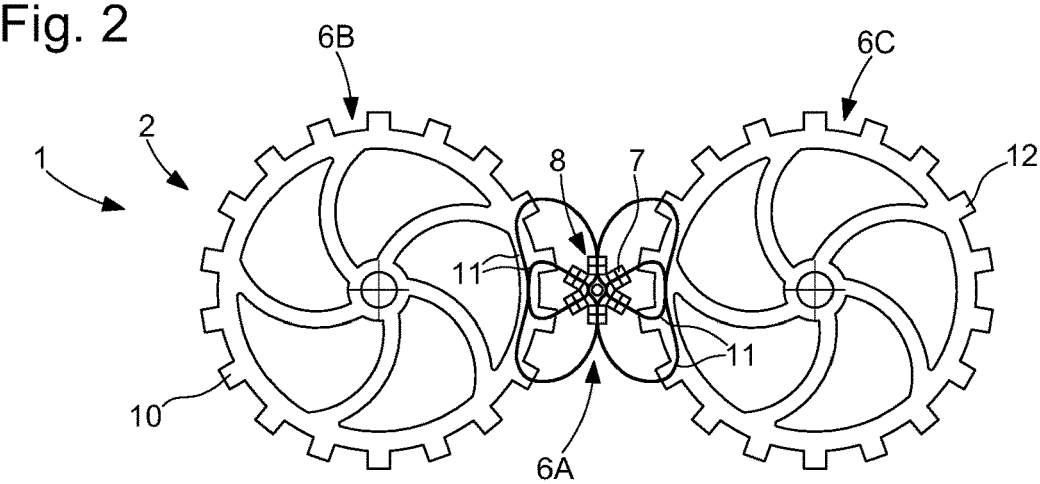
FIG. 2 is a similar view to that in FIG. 1, according to a second example of the first embodiment of the mechanism of the invention.

According to a second example of the first embodiment of the mechanism 1, shown in FIG. 2, the first wheel 6B, respectively the second wheel 6C, comprises an annular rim made of a magnetic material, typically made of a soft ferromagnetic material, defining, at the outer periphery thereof, eighteen teeth also made of a soft ferromagnetic material forming the first magnetic toothing 10, respectively the second magnetic toothing 12. Such an annular rim forms a continuous circular base for each of the first and second magnetic toothings 10, 12, via which the magnetic paths of the interacting magnetic fluxes are closed. The third wheel 6A comprises six bipolar magnets with radial magnetisation/polarisation and respectively form the six magnetised teeth of the third magnetic toothing 8.

In these first two examples of the first embodiment shown in FIGS. 1 and 2, the first, second and third wheels 6B, 6C, 6A extend in a collinear manner in the same general plane. Alternatively, the first, second and third wheels 6B, 6C, 6A can extend in the same general plane without being collinear.

Figure 3:
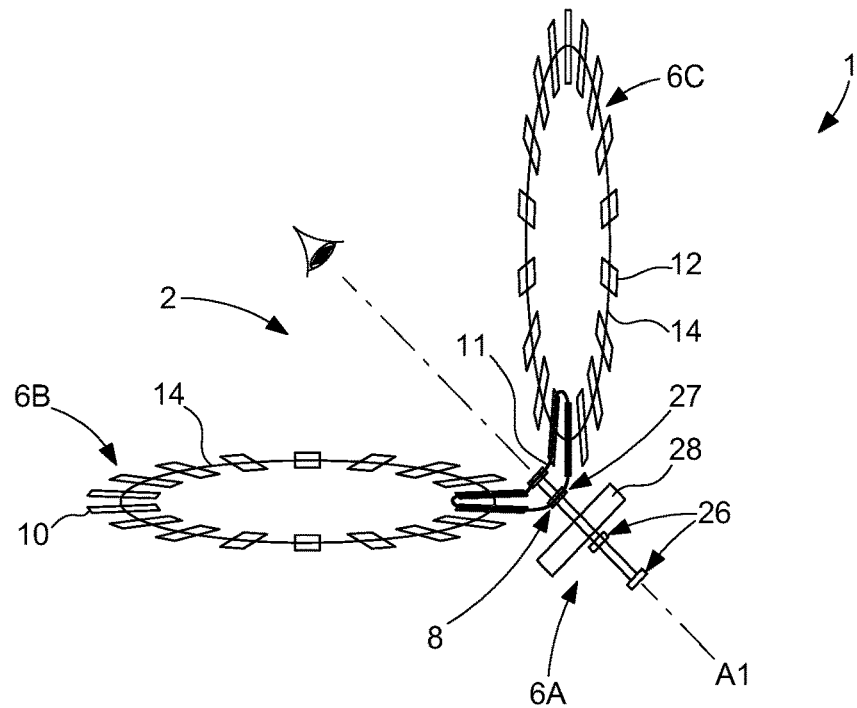
FIG. 3 is a perspective, side view of a second embodiment of the mechanism of the invention.
Figure 4:
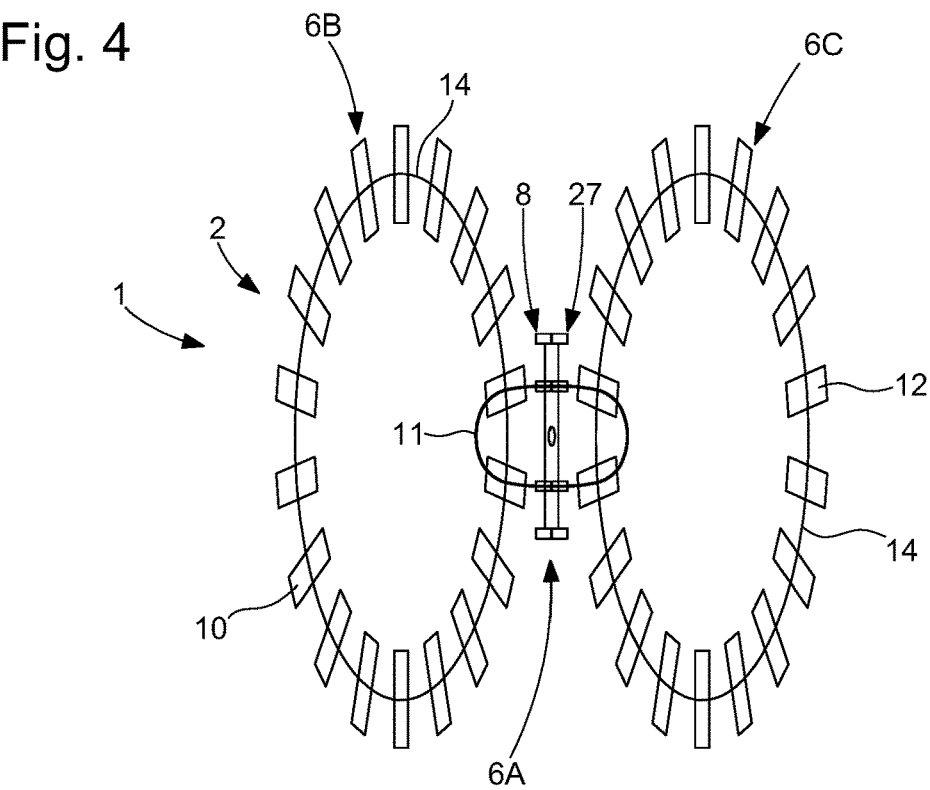
FIG. 4 is a perspective, top view, viewed along the line of sight A1, of the mechanism in FIG. 3.

A second embodiment of the mechanism 1 comprising a magnetic gear 2 according to the invention will be described hereinbelow with reference to FIGS. 3 to 5. According to this second embodiment of the mechanism 1, each of the first, second and third wheels 6B, 6C, 6A extend in a separate plane. In the specific example embodiment shown in FIGS. 3 to 5, and without this being limiting for this second embodiment, the first and second wheels 6B, 6C extend in substantially perpendicular planes. The third wheel 6A extends in a plane disposed at substantially 45 degrees to the plane in which the first wheel 6B extends and to the plane in which the second wheel 6C extends. The third wheel 6A comprises six bipolar magnets 26 defining a third magnetic toothing 8 and a fourth magnetic toothing 27. The third magnetic toothing 8 is formed by a plurality of first permanent magnetic poles 29 located, relative to a median plane of the plurality of bipolar magnets 26, on the first magnetic toothing 10 side of the first wheel 6B. The fourth magnetic toothing 27 is defined by a plurality of second permanent magnetic poles 31 located, relative to the median plane of the plurality of bipolar magnets 26, on the second magnetic toothing 12 side of the second wheel 6C. Each first permanent magnetic pole 29 and the corresponding second permanent magnetic pole 31 jointly form one of the bipolar magnets.

Figure 5:
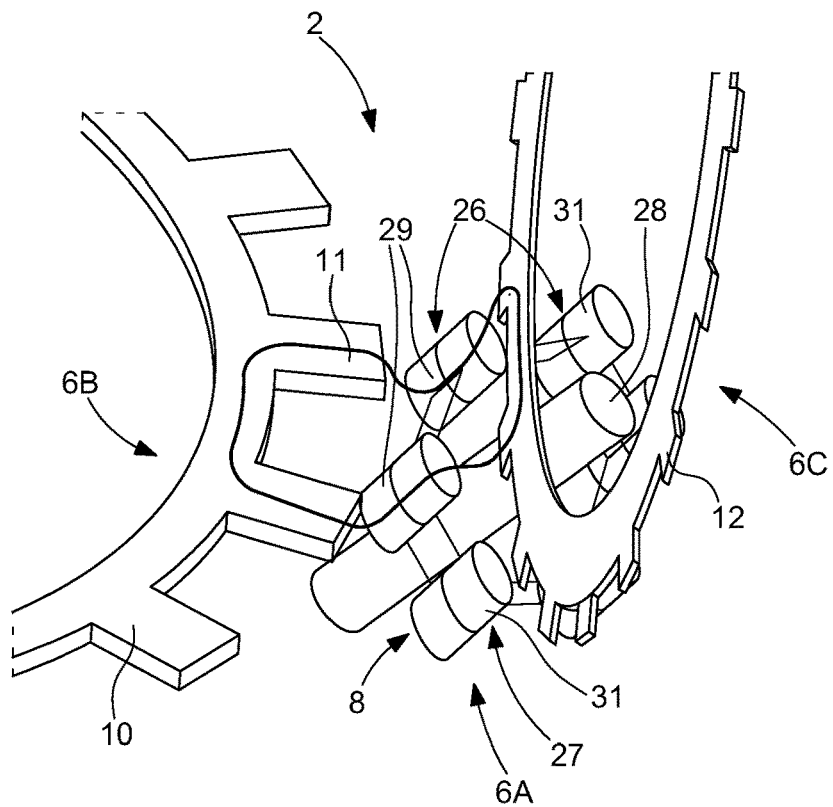
FIG. 5 is a perspective, enlarged view showing a feature of the mechanism in FIG. 3.

As shown in FIG. 5, the first and second wheels 6B, 6C comprise the same number of teeth made of a ferromagnetic material. These two wheels 6B and 6C are of the type shown in FIG. 2. The six bipolar magnets 26 of the third wheel 6A are each magnetised along an axis parallel to the rotational axis 28 of the third wheel. The magnetised teeth 29, 31 of the third toothing 8 and of the fourth toothing 27 are thus arranged in such a way that the magnetic fluxes emerge from these magnetised teeth with a main direction substantially parallel to the rotational axis 28 of the third wheel 6A.

In a specific embodiment (not shown in the figures), the three wheels are located in three separate planes that are parallel, with the third wheel being advantageously located in an intermediate plane. In this advantageous example, the third wheel includes a plurality of bipolar magnets having an axial magnetisation/polarisation, the third magnetic toothing of the third wheel being defined by a plurality of first permanent magnetic poles respectively forming the plurality of bipolar magnets and located, relative to a median plane of the plurality of bipolar magnets, on the first magnetic toothing side of the first wheel, the first permanent magnetic poles being at least partially superimposed on this first magnetic toothing. The third wheel further comprises a fourth magnetic toothing defined by a plurality of second permanent magnetic poles respectively forming the plurality of bipolar magnets and located on the second magnetic toothing side of the second wheel, the second permanent magnetic poles being at least partially superimposed on this second magnetic toothing. Thus, the number of magnetised teeth of the third magnetic toothing and the number of magnetised teeth of the fourth magnetic toothing are equal to one another and to the number of bipolar magnets carried by the third wheel.

According to another specific alternative embodiment (not shown in the figures), the first and second wheels 6B, 6C extend in the same first plane, and the third wheel 6A extends in a second plane that is separate from and parallel to the first plane. In such a case, the third wheel advantageously carries a plurality of bipolar magnets with axial polarisation, which are covered, on the side opposite the first plane, by a plate made of a soft ferromagnetic material which closes the paths of the magnetic fluxes of this plurality of bipolar magnets on the side opposite the first plane.

The invention claimed is:

1. A timepiece mechanism, comprising a magnetic gear including a first wheel and a second wheel provided with a first magnetic toothing and a second magnetic toothing respectively;
   wherein the first and second magnetic toothings are respectively formed by first and second teeth made of a soft ferromagnetic material; and
   wherein the magnetic gear further comprises a third wheel arranged between the first and second wheels and provided with first permanent magnetic poles forming the magnetised teeth of a third magnetic toothing comprised in the third wheel and which is configured in such a way that first magnetic fluxes, having alternating polarities, emerge respectively from the magnetised teeth, the third wheel and the first wheel being arranged in such a way that the third magnetic toothing has a first magnetic coupling with the first magnetic toothing generated by said first magnetic fluxes which momentarily polarise, in magnetic attraction, teeth of the first magnetic toothing, momentarily located in a first magnetic coupling zone with the third magnetic toothing and through which first magnetic fluxes from among said first magnetic fluxes respectively flow, the third wheel and the second wheel being arranged in such a way that the third magnetic toothing or a fourth magnetic toothing, which is comprised by the third wheel and which is formed by second permanent magnetic poles from which second magnetic fluxes emerge with alternating polarities, has a second magnetic coupling with the second magnetic toothing, which is generated by said first magnetic fluxes, or respectively by said second magnetic fluxes, which momentarily polarise, in magnetic attraction, teeth of the second magnetic toothing which are momentarily located in a second magnetic coupling zone with the third magnetic toothing or with the fourth magnetic toothing and through which first magnetic fluxes from among said first magnetic fluxes flow, or respectively though which second magnetic fluxes from among said second magnetic fluxes flow.

2. The mechanism according to claim 1, wherein the third wheel is mounted such that it can rotate freely, the third wheel being configured to transmit a torque received from the first wheel, which is a drive wheel in the magnetic gear, to the second wheel which is driven by the first wheel via the third wheel so as to carry out a function of the mechanism or to transmit within the mechanism a torque received from the first wheel.

3. The mechanism (1) according to claim 1, wherein the first magnetic toothing comprises N1 teeth, the second magnetic toothing comprises N2 teeth, and the third magnetic toothing comprises N3 teeth; wherein the number N3 is an even number between four and ten, inclusive; and wherein the ratio between the number N1 and the number N3, and the ratio between the number N2 and the number N3, are each greater than or equal to two.

4. The mechanism (1) according to claim 1, wherein the third wheel has a central part made of a ferromagnetic material, on the periphery whereof its said permanent magnetic poles are arranged in pairs respectively with as many complementary magnetic poles, forming bipolar magnets having radial magnetisation and respectively defining the magnetised teeth of the third magnetic toothing.

5. The mechanism according to claim 1, wherein the first wheel or the second wheel comprises a rim forming a continuous circular base for the respective magnetic toothing, the rim being made of a soft ferromagnetic material so as to form a closure closing magnetic paths of said magnetic fluxes.

6. The mechanism according to claim 1, wherein at least the first and second wheels are coplanar.

7. The mechanism according to claim 6, wherein the first, second and third wheels are coplanar.

8. The mechanism according to claim 1, wherein at least the first and second wheels extend in separate planes.

9. The mechanism according to claim 8, wherein each of the first, second and third wheels extend in a separate plane.

10. The mechanism according to claim 9, wherein the third wheel includes said fourth magnetic toothing, wherein the first and second wheels extend in substantially perpendicular planes, wherein the third wheel extends in a plane disposed at substantially 45 degrees to the plane in which the first wheel extends and to the plane in which the second wheel extends; and wherein each of said first permanent magnetic poles forms, with a corresponding second permanent magnetic pole from among said second permanent magnetic poles, a bipolar magnet having axial magnetisation, the first, second and third wheels being positioned such that the one or more bipolar magnets coupled to the first magnetic toothing are simultaneously coupled to the second magnetic toothing (12).

11. The mechanism according to claim 10, wherein the first wheel and the second wheel each comprise a rim forming a continuous circular base respectively for the first magnetic toothing and the second magnetic toothing, the rim being made of a soft ferromagnetic material so as to form a closure closing magnetic paths respectively of said first magnetic fluxes and of said second magnetic fluxes.

* * * * *